(12) United States Patent
Govil (10) Patent No.: US 11,849,078 B2
(45) Date of Patent: *Dec. 19, 2023

(54) METHODS AND SYSTEMS FOR DYNAMIC MEDIA CONTENT

(71) Applicant: DISH Network Technologies India Private Limited, Karnataka (IN)

(72) Inventor: Vineet Govil, Bangalore (IN)

(73) Assignee: DISH Network Technologies India Private Limited

(*) Notice: Subject to any disclaimer, the term of this patent is extended or adjusted under 35 U.S.C. 154(b) by 0 days.

This patent is subject to a terminal disclaimer.

(21) Appl. No.: 17/991,203

(22) Filed: Nov. 21, 2022

(65) Prior Publication Data

US 2023/0079535 A1 Mar. 16, 2023

Related U.S. Application Data

(63) Continuation of application No. 16/656,042, filed on Oct. 17, 2019, now Pat. No. 11,509,945.

(51) Int. Cl.
| | |
|---|---|
| *H04N 21/234* | (2011.01) |
| *H04N 21/2343* | (2011.01) |
| *H04N 21/235* | (2011.01) |
| *H04N 21/44* | (2011.01) |
| *H04N 21/435* | (2011.01) |
| *H04N 21/84* | (2011.01) |
| *H04N 21/4402* | (2011.01) |

(52) U.S. Cl.
CPC ..... *H04N 21/23424* (2013.01); *H04N 21/235* (2013.01); *H04N 21/2343* (2013.01); *H04N 21/435* (2013.01); *H04N 21/4402* (2013.01); *H04N 21/44016* (2013.01); *H04N 21/84* (2013.01)

(58) Field of Classification Search
CPC ......... H04N 21/23424; H04N 21/2343; H04N 21/235; H04N 21/435; H04N 21/44016; H04N 21/4402; H04N 21/84; H04N 21/234318; H04N 21/45452; H04N 21/458; H04N 21/23418

See application file for complete search history.

(56) References Cited

U.S. PATENT DOCUMENTS

| | | | |
|---|---|---|---|
| 9,626,798 B2 * | 4/2017 | Zavesky | ............ H04N 21/4394 |
| 11,206,435 B2 | 12/2021 | Gordon | |
| 2007/0136745 A1 | 6/2007 | Garbow et al. | |

(Continued)

*Primary Examiner* — Nathan J Flynn
*Assistant Examiner* — Christine A Kurien
(74) *Attorney, Agent, or Firm* — KW Law, LLP (57) ABSTRACT

Methods and systems are provided for presenting media content capable of being dynamically adapted. One method involves analyzing content of a media program to identify a replaceable object at a spatial location within the content at a temporal location within the content, analyzing the spatial location of the content corresponding to the replaceable object within the content to identify one or more attributes of the replaceable object, identifying a substitute object based at least in part on the one or more attributes associated with the replaceable object, augmenting the temporal location of the content to include the substitute object at the spatial location within the content in lieu of the replaceable object, and providing the augmented version of the content to a media player for presentation.

17 Claims, 5 Drawing Sheets

(56) References Cited

U.S. PATENT DOCUMENTS

| | | | |
|---|---|---|---|
| 2008/0195938 A1* | 8/2008 | Tischer | H04N 21/6543 |
| | | | 715/255 |
| 2009/0143881 A1* | 6/2009 | Smyers | G11B 27/034 |
| | | | 700/90 |
| 2014/0150019 A1* | 5/2014 | Ma | H04N 21/458 |
| | | | 725/34 |
| 2014/0280272 A1* | 9/2014 | Choque | G06F 16/137 |
| | | | 707/758 |
| 2015/0189350 A1* | 7/2015 | Jo | H04N 21/8545 |
| | | | 725/32 |
| 2016/0212455 A1* | 7/2016 | Manna | H04N 21/812 |
| 2017/0208369 A1* | 7/2017 | Major | H04N 21/8456 |
| 2019/0205938 A1* | 7/2019 | Van Winkle | G06Q 30/0273 |
| 2019/0208285 A1* | 7/2019 | Chapman | H04N 21/25891 |
| 2019/0238952 A1* | 8/2019 | Boskovich | G06F 16/7837 |
| 2020/0059693 A1* | 2/2020 | Neumeier | H04N 21/4383 |
| 2020/0068256 A1* | 2/2020 | Gordon | H04N 21/23418 |
| 2020/0169773 A1* | 5/2020 | Major | H04N 21/23424 |

\* cited by examiner

FIG.6

METHODS AND SYSTEMS FOR DYNAMIC MEDIA CONTENT

PRIORITY CLAIM

This application is a continuation of U.S. patent application Ser. No. 16/602,042 (now U.S. Pat. No. 11,509,945) filed on Oct. 17, 2019, which is incorporated herein by reference.

TECHNICAL FIELD

Embodiments of the subject matter described herein relate generally to multimedia distribution systems, and more particularly, to methods and systems that support dynamically modifying media content during distribution.

BACKGROUND

Media content can now be received from any number of different sources on any number of different devices or "placeshifted" from one device to another. Media content can also be stored in a personal or digital video recorder (DVR) or the like for viewing at a later time ("time shifting"). Live or recorded media content can also be "placeshifted" to allow viewing at remote locations away from the viewer's primary television set. While viewing experiences are increasingly varied, the media content is static or fixed. Accordingly, it is desirable to improve the user experience by adapting media content to be personalized and/or account for the current viewing context. Other desirable features and characteristics will become apparent from the subsequent detailed description and the appended claims, taken in conjunction with the accompanying drawings and the foregoing technical field and background.

BRIEF SUMMARY

Embodiments of methods, systems, and devices for dynamically adapting media content for presentation are provided. One method involves analyzing metadata associated with the media content to identify a replaceable object within the media content, identifying attributes associated with the replaceable object based on the metadata associated with the media content, identifying a substitute object based at least in part on the attributes associated with the replaceable object, modifying the media content to include the substitute object within the media content in lieu of the replaceable object, resulting in an augmented version of the media content, and providing the augmented media content to a media player for presentation.

In another embodiment, a method of managing media content is provided. The method involves receiving media content from a content source, analyzing the media content to identify a replaceable object within the media content, analyzing a portion of the media content corresponding to the replaceable object within the media content to identify one or more attributes of the replaceable object, and storing metadata indicating the presence and/or location of the replaceable object within the media content and the one or more attributes of the replaceable object in association with the media content.

In another embodiment, a method is provided for dynamically adapting a media program. The method involves analyzing content of the media program to identify a replaceable object at a spatial location within the content at a temporal location within the content, analyzing the spatial location of the content corresponding to the replaceable object within the content to identify one or more attributes of the replaceable object, identifying a substitute object based at least in part on the one or more attributes associated with the replaceable object, augmenting the temporal location of the content to include the substitute object at the spatial location within the content in lieu of the replaceable object, resulting in an augmented version of the content of the media program, and providing the augmented version of the content to a media player for presentation.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description of the invention is merely exemplary in nature and is not intended to limit the invention or the application and uses of the invention. Furthermore, there is no intention to be bound by any theory presented in the preceding background, brief summary, or the following detailed description.

Embodiments of the subject matter described herein generally relate to providing dynamically adaptable media content. As used herein, "media content," "media program," "multimedia content," or variants thereof should be understood as referring to any audiovisual programming or content in any streaming, file-based or other format. The media content generally includes data that, when processed by a media player or decoder, allows the media player or decoder to present a visual and/or audio representation of the corresponding program content to a viewer (i.e., user of a device including the media player or decoder). In one or more embodiments, a media player can be realized as a piece of software that plays multimedia content (e.g., displays video and plays audio). For purposes of explanation, the subject matter may be described herein primarily in the context of being implemented at a broadcast head-end or server system that ingests or otherwise receives media content from various content sources and subsequently distributes or transmits media content to any number of other devices over a communications network, a distribution network, and/or the like; however, it should be noted that the subject matter is not necessarily so limited to implementation at an intermediary component in a media distribution system, and may be implemented in an equivalent manner at an end point (e.g., a content source, client device, or the like).

As described in greater detail below, in exemplary embodiments, received media content is analyzed to detect or otherwise identify objects within portions or regions of the media content. When an object is detected within the media content, the portion of the media content corresponding to the object is further analyzed to identify or otherwise determine one or more attributes or characteristics of the detected object. Metadata that indicates the presence and/or location of the detected object within the media content along with the detected attribute(s) associated with the detected object is stored or otherwise maintained in association with the media content. For example, for a given detected object, the metadata may include a timestamp or other temporal information indicating when the detected object is present within the media content, coordinate pixel locations or other spatial information indicating where the detected object is present within the media content at the corresponding times, and additional data or information identifying what the object is, visual and/or physical characteristics of the object, and the like. In this regard, frames of video or other multimedia content may be effectively tagged or marked to indicate the presence of a detected object within those frames, along with additional metadata characterizing the detected object and its spatial orientation within those frames.

Thereafter, during distribution or presentation of the media content, the metadata associated with the media content may be continually analyzed substantially in real-time to identify when a detected object is present the media content. Thereafter, the metadata characterizing the attributes of the detected object may be analyzed to identify or otherwise determine what substitute object media content should be presented at corresponding spatial and temporal locations within the media content in lieu of the originally detected object. In this regard, there are numerous different criteria that may be utilized to select a substitute object that is more likely to be relevant to the particular user viewing the content and/or to the current viewing context (e.g., temporal relevance, geographic relevance, and/or the like) to personalize or otherwise dynamically adapt the media content to better align with the current viewing experience. An augmented version of the media content is then generated by modifying the spatial regions of the media content corresponding to the detected object to include graphical representations of the substitute object in lieu of the original object. The augmented version of the media content is then provided to a media player to present the dynamically adapted media content to the viewer that does not include the originally detected object(s), but rather, substituted objects that are more likely to be relevant to the viewer, the current viewing context, and/or the like.

Figure 1:
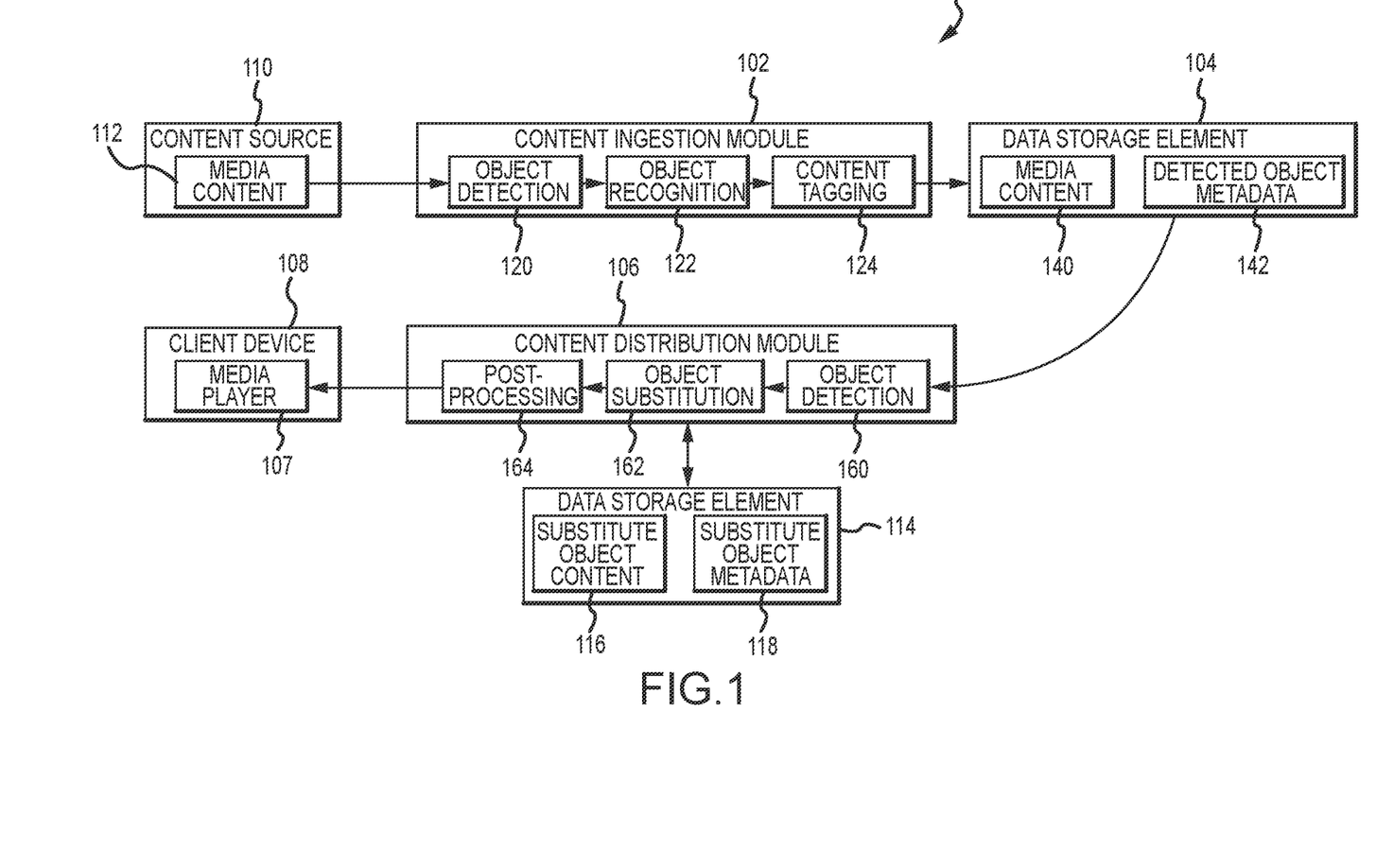
FIG. 1 depicts a block diagram of an exemplary embodiment of a media distribution system.

FIG. 1 depicts an exemplary embodiment of a media distribution system 100 that includes a content ingestion module 102 that detects objects within media content 112 received from a content source 110 and stores metadata 142 for the detected objects in a data storage element 104 in association with a stored version of the media content 140. A content distribution module 106 analyzes the detected object metadata 142 associated with the media content 140 during distribution and/or playback of the media content 140 and modifies the media content 140 substantially in real-time to include substitute object content 116 in lieu of detected object content prior to providing the augmented version of the media content 140 to a media player 107 for playback at a client device 108. It should be appreciated that FIG. 1 is a simplified representation of the media distribution system 100 for purposes of explanation and is not intended to be limiting.

In the illustrated embodiment, the content source no generally represents any sort of device or system that generates or otherwise provides audiovisual media content 112 to the content ingestion module 102. For example, in one or more embodiments, the content source 110 may be realized as a broadcast programming source that provides a broadcast media program or similar broadcast media content formatted for distribution over a broadcast distribution network, a satellite distribution network, or the like. In other embodiments, the content source 110 may be realized as an online programming source that provides media content 112 formatted for distribution and/or consumption over the Internet or other communications networks. In other embodiments, the content source 110 could be realized as an on-demand programming source that provides media content 112. In this regard, it will be appreciated the subject matter described herein is not limited to any particular type of content source 110 or content format.

The content ingestion module 102 generally represents a computing system including hardware, firmware, software, logic, circuitry, and/or other components configured to support receiving media content 112 from the content source 110 and tagging or otherwise associating the media content with metadata 142 for objects detected within the media content 112. In one or more exemplary embodiments, the content ingestion module 102 is implemented by or at a server computing system, such as an origin or host server, that distributes media content over a communications network. In other embodiments, the content ingestion module 102 is implemented by or at a broadcast control system (e.g., a digital broadcast satellite (DBS) master control station). In yet other embodiments, the content ingestion module 102 could be implemented by or at the content source 110 (e.g., for object detection and tagging concurrent to the production or generation of the media content 112). In this regard, the content ingestion module 102 and related content ingestion processes described herein may be implemented in connection with encoding or otherwise converting the audiovisual media content 112 into different formats and/or different types of files, packets, streamlets, and/or the like which may then be broadcast or otherwise distributed over a network. That said, in yet other embodiments, the content ingestion module 102 and related content ingestion processes described herein could be implemented in an equivalent manner at the client device 108 or another destination device that facilitates playback or presentation of the media content (e.g., at a set-top box (STB) or other media device that receives media content over-the-air, over-the-top, and/or the like).

In the illustrated embodiment, the content ingestion module 102 includes or otherwise leverages a processing system and a data storage element or other non-transitory computer readable media that stores programming instructions that, when read and executed, cause the processing system to generate, execute, or otherwise implement an object detection module 120, an object recognition module 122, and a content tagging module 124. In this regard, although the modules 120, 122, 124 are depicted as distinct or separate components for purposes of explanation, in practice, the modules 120, 122, 124 may be integrated or otherwise combined into a common software application or process that is executed or otherwise implemented at the content ingestion module 102.

As described in greater detail below primarily in the context of FIG. 2 and FIG. 4, in exemplary embodiments, the object detection module 120 receives the media content 112 provided as input by the content source no and parses or otherwise analyzes the media content 112 to detect or otherwise identify objects within the media content 112. For example, the object detection module 120 may analyze individual video frames and/or sequential video frames to detect or otherwise identify distinct objects that are captured or otherwise contained within the media content 112. For each detected object, the object detection module 120 may record or otherwise identify the timestamp or other temporal information that characterizes when the object is present within the media content 112 (e.g., the object's temporal location) along with pixel locations or other spatial information that characterizes where the object is within the media content 112 (e.g., the object's spatial location). It should be noted there are numerous different manners in which the object detection module 120 may detect objects, and the subject matter is not intended to be limited to any particular implementation. For example, any number of different artificial intelligence, machine learning, or pattern recognition techniques may be employed, individually or in combination, to continually analyze the video content and recognize or detect objects within the video content. In other embodiments, the corresponding audio content that is contemporaneous to or otherwise temporally associated with or relevant to particular portions of video content may be continually analyzed using speech recognition or other audio detection algorithms to detect an object within the audio content, and then assign or otherwise associate the detected object with the contemporaneous or concurrent video frames. In this regard, in some embodiments, the audio content may be analyzed for purposes of object detection concurrent to or in concert with analyzing the video content to confirm, validate, or otherwise improve the accuracy or reliability of the object detection, facilitate artificial intelligence self-learning or correction techniques, and/or the like. In yet other embodiments, the video content may be tagged, marked, or otherwise designated as including an object by a content creator or provider (e.g., providing metadata that identifies and/or characterizes the object captured within certain video frames).

When an object is detected, the object detection module 120 provides the temporal and spatial information characterizing the location of the detected object within the media content 112 to the object recognition module 122, which, in turn analyzes those locations of the media content 112 to identify or otherwise determine one or more attributes associated with the detected object. In this regard, the object recognition module 122 may analyze the identified pixel locations or spatial information for where the detected object is located within the timestamped video frames for when the object is present at those spatial locations, individually or sequentially, to detect or otherwise identify various characteristics of the detected object, such as, for example, an object type associated with the detected object and other visual and/or physical characteristics associated with the detected object (e.g., the size, shape, color, etc.).

The object recognition module 122 outputs the metadata characterizing the attributes of the detected object to the content tagging module 124, which utilizes the temporal and spatial information associated with the detected object to establish and maintain an association between the detected object metadata and the corresponding portions of the media content 112 where that detected object occurs. For example, the content tagging module 124 may generate or otherwise create an identifier for a detected object and then store or otherwise maintain that detected object identifier in association with stored portions of the media content 140 that correspond to the temporal occurrence of the detected object within the media content 112, with the detected object identifier also being associated with the stored metadata 142 characterizing the attributes of that respective object. For example, the detected object metadata 142 may be stored or otherwise maintained in a table or similar data structure in the data storage element 104 that is indexed by the object identifier, with each row or entry in the table including the different pieces of metadata characterizing the attributes of the respective object assigned to that object identifier. Similarly, one or more stored versions of the media content 140 may be maintained in the data storage element 104, with the individual packets, segments, streamlets, or the like associated with the timestamps for a detected object being tagged or otherwise associated with the object identifier assigned to that detected object, thereby establishing a relationship between the stored media content 140 and the temporally relevant detected object metadata 142.

For example, in one or more embodiments, the content ingestion module 102 is implemented in connection with an encoding system configured to convert the multimedia content into fixed duration media segments (or streamlets) that are stored or otherwise maintained in the data storage element 104 (e.g., stored media content 140). To support adaptive bitrate streaming, the media content 112 may be encoded into different streams having different qualities associated therewith (e.g., a low quality stream, a medium quality stream, and a high quality stream), where each of the streams represents a copy or a version of the media content 112 encoded and compressed to a different bitrate. Each media segment includes a portion of the media content contained in the respective stream, which may be encapsulated as an independent media object (or file), thereby allowing the media segments to be cached individually and to be independently playable by a media player. The content in a media segment may have a unique time index in relation to the beginning of the media content contained in the stream. For example, the content contained in each media segment may have a duration of two seconds, such that media segment 0 may have a time index of 00:00 representing the beginning of content playback, and media segment 1 may have a time index of 00:02, and so on. In this regard, for a detected object that occurs at a timestamp or frame(s) within the first two seconds of the media content 112, the content tagging module 124 may tag or otherwise associate each of the different quality versions of media segment 0 in the data storage element 104 with the identifier assigned to that detected object, thereby associating portions of the stored media content 140 with the temporally relevant detected object metadata 142. The detected object tag may also include spatial information identifying where the respective detected object associated with the assigned object identifier is spatially located within the timestamped portion of the media content 140. That said, the subject matter described herein is not limited to adaptive streaming or any particular type of encoding scheme.

Still referring to FIG. 1, in exemplary embodiments, the data storage element 104 may be realized as any sort of type or combination of memory elements capable of maintaining one or more encoded, recorded and/or stored versions of the media content 140 and the associated detected object metadata 142 that is also capable of being read or accessed by the content distribution module 106. For example, in one or more embodiments, the data storage element 104 includes or is otherwise realized as one or more databases that may be communicatively coupled to or otherwise associated with a host server, an origin server, a broadcast head-end, and/or the like that is responsible for distributing the media content 140 to any number of different end user devices. The data storage element 104 may include one or more hard disk drives (HDDs), flash memory, caches, buffers, or any other suitable non-volatile data storage elements or combinations thereof.

The content distribution module 106 is coupled to the data storage element 104 to obtain an encoded or stored version of the media content 140 from the data storage element 104 for distribution or provisioning to a media player 107 at a client device 108. Similar to the content ingestion module 102, depending on the embodiment, the content distribution module 106 may be implemented at any one of a host or origin server computing system, a broadcast control system, a STB, or any other device or system upstream of the media player 107. In this regard, in some embodiments, the content distribution module 106 may be implemented at the client device 108 and/or integrated with the media player 107 and/or client device 108. That said, exemplary embodiments are described herein in the context of the content distribution module 106 being implemented separate from the media player 107 on a distinct device or system communicatively coupled to the client device 108 via a network. In this regard, in some embodiments, the content distribution module 106 may be implemented at or by the same computing device or system that supports the content ingestion module 102, for example, by implementing both the content ingestion module 102 and the content distribution module 106 at a broadcast control system, an origin server system, and/or the like.

Still referring to FIG. 1, the client device 108 may be any device, system, component, module, hardware and/or the like that is capable of communicating with the content distribution module 106 to stream or otherwise receive media content that is playable by the media player 107. For example, depending on the embodiment, client device 108 may be realized as a conventional personal computer, portable computer, a tablet computer, workstation and/or other computing system, a mobile (or cellular) telephone, a smartphone, a personal digital assistant, a STB, a streaming device, a video game player, and/or any other device capable of receiving media programs and presenting audio and/or visual content. In this regard, the client device 108 may include or otherwise be coupled to a display device, such as a monitor, screen, or another conventional electronic display, capable of graphically presenting visual content, data and/or information that is generated or otherwise provided by the media player 107 executing on the client device 108. In this regard, the client device 108 includes a processing system and a data storage element (or memory) that is coupled to or otherwise accessed by the processing system and stores programming instructions that, when read and executed, cause the processing system of the client device 108 to generate the media player application 107 executing thereon and perform various tasks, functions, processes and/or operations and support the subject matter described herein. The processing system may be realized as any sort of processor, microprocessor, microcontroller, digital signal processor, or any other suitable processing device, or any suitable combination thereof. The media player 107 may be a standalone media player, or the media player 107 may be implemented as a plugin or other applet that runs within another application as desired. In some embodiments, media player 107 is initially obtained from a networked host and/or the media player 107 is retrieved on an as-needed basis.

Similar to the content ingestion module 102, the content distribution module 106 includes or otherwise leverages a processing system and a data storage element or other non-transitory computer readable medium that stores programming instructions that, when read and executed, cause the processing system to generate, execute, or otherwise implement an object detection module 160, an object substitution module 162, and a post-processing module 164. Although the modules 160, 162, 164 are depicted as distinct or separate components for purposes of explanation, in practice, the modules 160, 162, 164 may be integrated or otherwise combined into a common software application or process that is executed or otherwise implemented at the content distribution module 106. Moreover, in some alternative embodiments where the content distribution module 106 functionality is implemented at the client device 108, one or more of the modules 160, 162, 164 may be integrated with or otherwise incorporated into the media player 107.

As described in greater detail below primarily in the context of FIG. 3 and FIG. 5, the object detection module 160 obtains or otherwise receives the media content 140 selected for presentation by a viewer at the client device 108 from the data storage element 104 and parses or otherwise analyzes the encoded media content 140 to detect or otherwise identify tags corresponding to detected objects within the media content 140. In this regard, the object detection module 160 identifies when a segment or portion of the media content 140 that has an object identifier associated therewith. In response to identifying the presence of a detected object within a media segment, the object detection module 160 retrieves or otherwise obtains the metadata 142 associated with that object identifier from the data storage element 104 and provides the object metadata to the object substitution model 162 for analysis.

The object substitution model 162 analyzes the detected object metadata with respect to one or more substitution criteria to identify or otherwise determine a substitute object to be provided within the media content in lieu of the detected object. In this regard, the object substitution model 162 may include or otherwise be coupled to a data storage element 114 that maintains metadata 118 characterizing attributes of a plurality of different potential substitute objects along with audio and/or video content 116 associated with those respective potential substitute objects. For example, one or more fields of the detected object data 142 may be utilized to search or otherwise query a table of substitute object metadata 118 to identify a subset of one or more objects having similar attributes to the detected object for those fields. Thereafter, the object substitution model 162 may apply any number of additional substitution or selection criteria to exclude potential substitute objects and/or otherwise identify the best object to be substituted for the detected object. In this regard, the substitution or selection criteria may be chosen such that the substitute object identified as the best replacement for the detected object is influenced by the particular user associated with the client device 108 and/or media player 107 (e.g., to personalize the object within the media content) and/or the current viewing context (e.g., to tailor the object within the media content to the current geographic location of the client device 108, the current time and/or date, etc.). The identifier assigned to the identified substitute object is then utilized to retrieve the corresponding audio and/or visual content 116 associated with that substitute object identifier from the data storage element 114. The object substitution module 162 then utilizes the temporal and spatial information associated with the detected object to overwrite or otherwise insert the obtained substitute object audiovisual content 116 into the appropriate location within the media content 140 in lieu of the detected object. In this regard, the object substitution module 162 effectively cuts or deletes the detected object from its corresponding temporal and spatial location within the media content 140 and intelligently replaces the original object at that corresponding temporal and spatial location with the substitute object content 116 from the data storage element 114, resulting in an augmented version of the media content to be provided to the media player 107.

The post-processing module 164 receives the augmented media content and performs image fusion, filtering, smoothing, and/or the like on the augmented media content (e.g., to mitigate discontinuities, mismatches between the original and substituted object, etc.) prior to transmitting or otherwise providing the augmented media content to the media player 107. The media player 107 receives the augmented version of the media content from the content distribution module 106 and then renders or otherwise presents the augmented media content at the client device 108, resulting in the substitute object content 116 from the data storage element 114 being presented within the media content 112 during presentation at temporal and spatial locations where the original object was located. In this manner, the original object may be dynamically adapted to the current viewer and/or the current viewing context to thereby improve or enhance the viewing experience.

Figure 2:
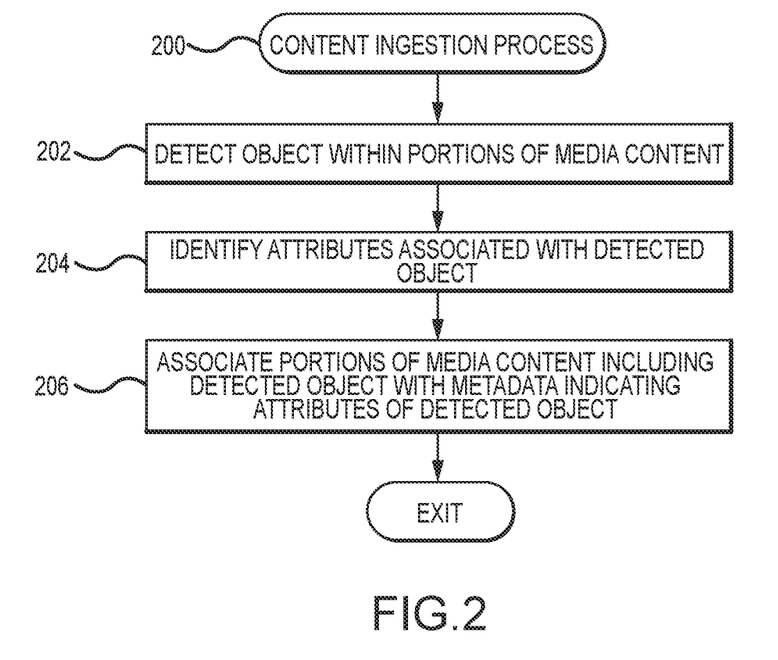
FIG. 2 is a flowchart of an exemplary content ingestion process suitable for implementation by the media distribution system of FIG. 1 in accordance with one or more embodiments.

FIG. 2 depicts an exemplary embodiment of a content ingestion process 200 suitable for implementation in a media distribution system, such as the media distribution system 100 of FIG. 1, to detect objects within multimedia content and tag, flag, or otherwise indicate the detected objects associated with the multimedia content to support subsequent substitution of alternative object multimedia content in lieu of the original object multimedia content. The various tasks performed in connection with the illustrated process 200 may be implemented using hardware, firmware, software executed by processing circuitry, or any combination thereof. For illustrative purposes, the following description may refer to elements mentioned above in connection with FIG. 1. In practice, portions of the content ingestion process 200 may be performed by different elements of a media distribution system 100. That said, for purposes of explanation, the content ingestion process 200 is described herein in the context of primarily being performed by a content ingestion module 102 in connection with encoding, ingesting, or otherwise receiving media content provided by a content source no. It should be appreciated that the content ingestion process 200 may include any number of additional or alternative tasks, the tasks need not be performed in the illustrated order and/or the tasks may be performed concurrently, and/or the content ingestion process 200 may be incorporated into a more comprehensive procedure or process having additional functionality not described in detail herein. Moreover, one or more of the tasks shown and described in the context of FIG. 2 could be omitted from a practical embodiment of the content ingestion process 200 as long as the intended overall functionality remains intact.

Referring to FIG. 2 with continued reference to FIG. 1, the illustrated content ingestion process 200 initializes or otherwise begins by parsing or otherwise analyzing media content to detect or otherwise identify an object within one or more portions of media content (task 202). For example, an object detection module 120 may parse or otherwise analyze individual video frames or other discrete segments of received media content 112 to detect the presence of one or more replaceable objects within the respective portions of the media content 112. In this regard, the replaceable objects being searched for consist of a set of objects for which substitution is available or otherwise desirable. Any number of different image processing, machine learning, and/or artificial intelligence techniques may be employed to detect the presence of one or more replaceable objects within a video frame or image based on changes in color, intensity, and/or other graphical characteristics within a region that is characteristic of a replaceable object. For example, artificial intelligence or machine learning may be employed to detect the presence of a consumer product (e.g., an electrical appliance, food item, vehicle, etc.) using a library or database of reference consumer product data (e.g., imagery and/or other metadata). In exemplary embodiments, one or more artificial intelligence self-learning algorithms is utilized concurrent to or in concert with the object detection to continually and dynamically update the library or reference database of used by the object detection algorithms. For example, when an object is detected within the video content, the pixels, imagery, or portions of the video content depicting that object may be stored or otherwise maintained in a data storage element 114 for potential subsequent use as substitute object media content 116, with the metadata characterizing the detected object also being stored or maintained in the association as substitute object metadata 118 in the data storage element 114 (e.g., in addition to being stored as detected object metadata 142). That said, it should be appreciated the subject matter described herein is not intended to be limited to any particular type of object detection algorithm or any particular type of object to be detected.

After detecting an object within the media content, the content ingestion process 200 continues by parsing or otherwise analyzing the portion(s) of the media content where the object was detected to recognize, characterize, or otherwise identify one or more attributes associated with the detected object (task 204). In this regard, the set of pixels or regions within a video frame identified as containing an object may be input or otherwise provided to the object recognition module 122, which, in turn, may perform object recognition, object classification, and/or other image processing techniques to characterize various attributes of the detected object, such as, for example, the size of the object, the shape of the object, the color of the object, the make, model and/or manufacturer of the object, a type or other taxonomic classification associated with the detected object, and/or the like. That said, it should be appreciated the subject matter described herein is not intended to be limited to any particular type of object recognition or classification algorithm.

After identifying the attributes associated with a detected object, the content ingestion process 200 tags, marks, or otherwise associates the portions of the media content including the detected object with the metadata characterizing attributes of that detected object (task 206). For example, as described above in the context of FIG. 1, a content tagging module 124 may generate a unique object identifier that is stored or otherwise maintained in association with the temporal portions or segments of the stored media content 140 corresponding to when that detected object is present, while also using that unique object identifier to store and maintain an association with the metadata 142 identified for that detected object. Thus, the unique object identifier may be utilized to link or otherwise relate the detected object metadata 142 with the appropriate portions of the media content 140 where a respective object was detected.

Figure 3:
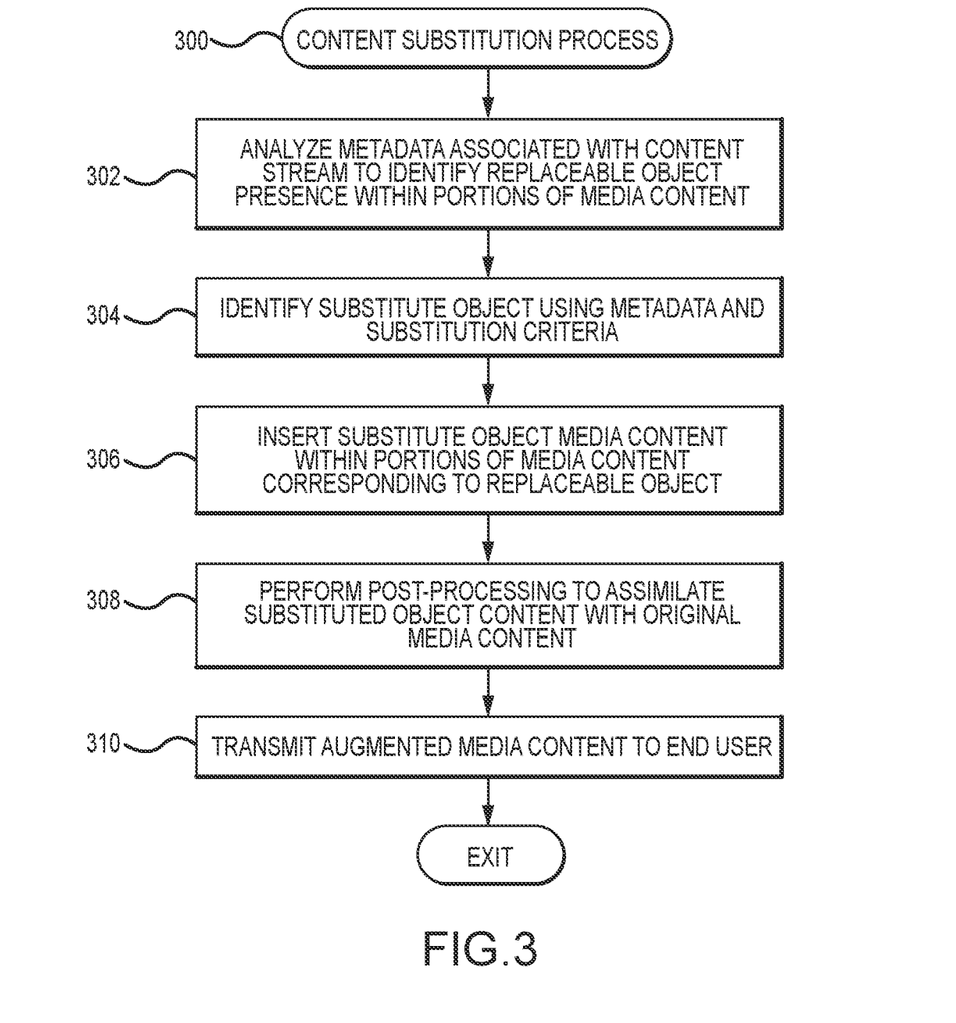
FIG. 3 is a flowchart of an exemplary content substitution process suitable for implementation by the media distribution system of FIG. 1 in accordance with one or more embodiments.

FIG. 3 depicts an exemplary embodiment of a content substitution process 300 suitable for implementation in a media distribution system, such as the media distribution system 100 of FIG. 1, to dynamically substitute object content for presentation in lieu of previously detected objects within multimedia content. The various tasks performed in connection with the illustrated process 300 may be implemented using hardware, firmware, software executed by processing circuitry, or any combination thereof. For illustrative purposes, the following description may refer to elements mentioned above in connection with FIG. 1. In practice, portions of the content substitution process 300 may be performed by different elements of a media distribution system 100. That said, for purposes of explanation, the content substitution process 300 is described here in the context of primarily being performed by a content distribution module 106 in connection with transmitting, distributing, or otherwise providing encoded media content 140 to a media player 107 on a client device 108. It should be appreciated that the content substitution process 300 may include any number of additional or alternative tasks, the tasks need not be performed in the illustrated order and/or the tasks may be performed concurrently, and/or the content substitution process 300 may be incorporated into a more comprehensive procedure or process having additional functionality not described in detail herein. Moreover, one or more of the tasks shown and described in the context of FIG. 3 could be omitted from a practical embodiment of the content substitution process 300 as long as the intended overall functionality remains intact.

Referring to FIG. 3 with continued reference to FIGS. 1-2, the content substitution process 300 analyzes metadata associated with a stream of media content during distribution and/or presentation to detect or otherwise when a replaceable object is present within the media content (task 302). In this regard, during streaming of the media content 140, the object detection module 160 may analyze portions or segments of the media content 140 for associated metadata that includes an identifier assigned to a detected object having object metadata 142 in the data storage element 104. For example, for each video frame, packet, streamlet, or other media segment that makes up the media content 140 being provisioned, the object detection module 160 may parser or otherwise analyze any metadata values associated with the respective media segment to identify when a segment of the media content 140 is associated with an object identifier having a corresponding entry in a detected object metadata table 142.

After identifying presence of a replaceable object within a media content stream, the content substitution process 300 continues by identifying or otherwise selecting a substitute object for replacing the originally detected object using the metadata associated with the original object and other selection or substitution criteria (task 304). For example, the various fields of metadata 142 characterizing the original object that was detected in the media content 112 may be provided to the object substitution module 162, which, in turn, queries the table of substitute object metadata 118 to identify entries for similar substitute objects based on similarities, matching, degree of differences, or other relationships between the metadata 118 associated with those substitute objects and the metadata 142 associated with the original object. In this regard, the object substitution module 162 may identify potential substitute objects having the same object type or other taxonomic classification(s) or the same or similar size, shape, or other visual characteristics as the original object. Other criteria may be utilized to further limit or reduce the set of potential substitute objects to facilitate arriving at a best or optimal substitute object for the current viewing context. For example, the characteristics, attributes, user preferences, and/or other user profile information associated with the viewer at the client device 108 may be utilized to identify, from among a set of potential substitute objects, a smaller subset of potential substitute objects that are more likely to be relevant, interesting, or influential with respect to the current viewer (e.g., based on the viewer's age, gender, or other demographic information). Other criteria such as the geographic location of the client device 108, the current time of day, the current day of the week, and/or other variables characterizing the current viewing context may be similarly utilized to further refine the potential substitute objects to those that are more likely to be relevant, interesting, or influential given the current viewing context. Any number of different scoring algorithms, filtering scheme and/or the like may be utilized to identify or select a substitute object using the original object metadata 142 and other substitution criteria, and the subject matter described herein is not intended to be limited to any particular algorithm, scheme, or criteria for identifying a substitute object. In a similar manner as described above in the context of object detection, the concurrent or contemporaneous audio content may be analyzed in concert with the object metadata to improve the relevance of the substituted object (e.g., based on identifying key words or phrases within the audio). For example, the object substitution module 162 may select a substitute object that most closely matches both the audio content and the metadata associated with the replaceable object.

After identifying a substitute object, the content substitution process 300 inserts or otherwise provides substitute media content corresponding to the identified substitute object in lieu of the original object content within portions of the media content where the original object was detected (task 306). For example, using the object identifier associated with substitute object that was selected using the substitute object metadata 118, the object substitution module 162 may retrieve or otherwise obtain, from the data storage element 114, media content corresponding to the identified substitute object. In this regard, the substitute object media content 116 includes imagery, video, and/or other audiovisual representations of the substitute object that corresponds to the entry in the substitute object metadata table 118 that was selected or otherwise identified for substitution. Using the timestamps associated with the occurrence of the replaceable object within the media content 140 and the pixel locations or other spatial data for the location of the replaceable within the media content 140, the object substitution module 162 overwrites or otherwise inserts the obtained substitute object media content 116 at the corresponding spatial locations within corresponding temporal locations within the media content 140.

After augmenting the media content to include substitute object content in lieu of the original object content, the content substitution process 300 continues by performing post-processing on the augmented media content to assimilate the inserted substitute object content with the original unmodified media content surrounding the substitute object content before transmitting or otherwise providing the augmented media content to a media player for presentation (tasks 308, 310). For example, a post-processing module 164 may perform filtering, smoothing, interpolation, fusion, and/or other techniques to blend the substitute object content with the surrounding media content to eliminate or otherwise mitigate discontinuities or other visual artifacts. Thereafter, the content distribution module 106 transmits or otherwise provides the augmented media content to the media player 107, which, in turn generates or otherwise renders the augmented media content at or on the client device 108, thereby allowing the viewer to view or otherwise perceive the substitute object media content 116 at the corresponding temporal and spatial locations within the media content 140 where the original object would have otherwise been presented.

Figure 4:
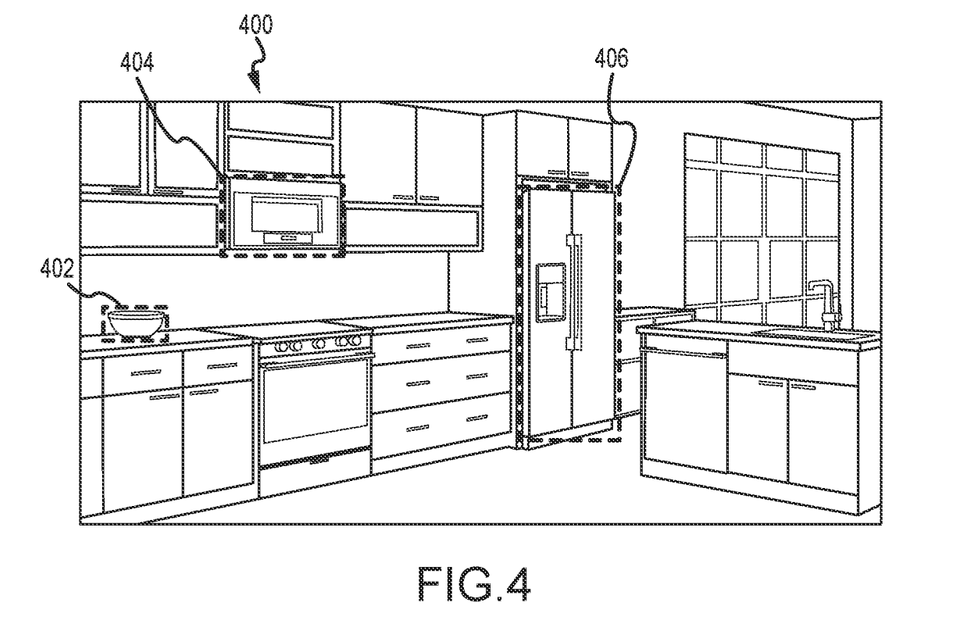
FIG. 4 depicts a frame of media content suitable for analysis in connection with the content ingestion process of FIG. 2 in accordance with one or more embodiments.
Figure 5:
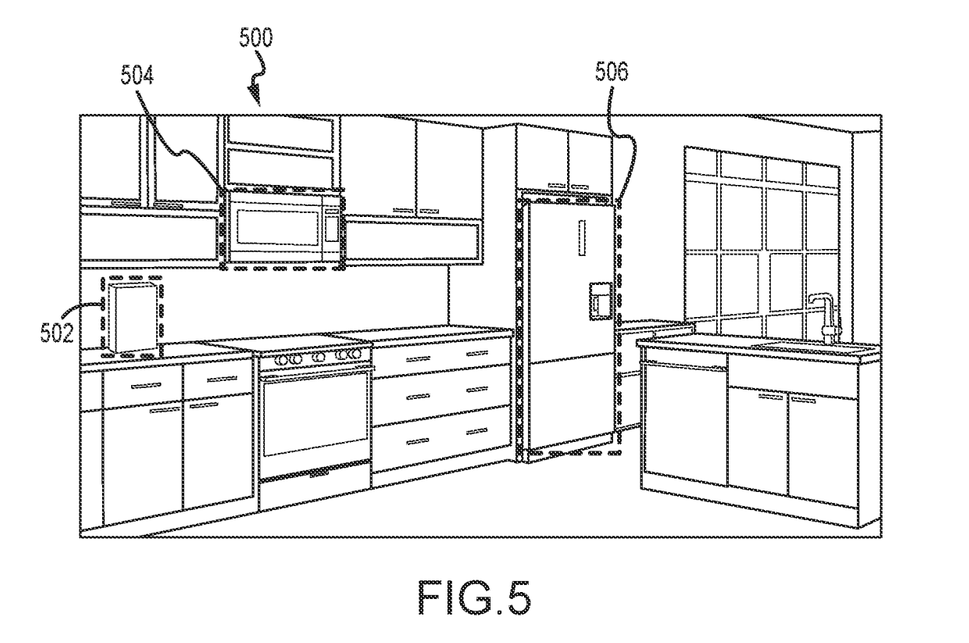
FIG. 5 depicts an augmented version of the frame of media content depicted in FIG. 4 in connection with the content substitution process in accordance with one or more embodiments.

FIGS. 4-5 depict an exemplary sequence of original and augmented versions of a video frame of media content suitable for analysis and object substitution in connection with the content ingestion process 200 of FIG. 2 and/or the content substitution process 300 of FIG. 3. In this regard, FIG. 4 depicts a graphical representation 400 of an original version of the video frame of media content suitable for analysis by the content ingestion module 102 and/or the content ingestion process 200 to detect objects within the video frame, and FIG. 5 depicts a graphical representation 500 of an augmented version of the video frame that may be generated or otherwise provided by the content distribution module 106 and/or the content substitution process 300.

Referring first to FIG. 4 with continued reference to FIGS. 1-2, upon analysis of the visual content of the video frame 400, the object detection module 120 may detect or otherwise identify a number of regions 402, 404, 406 within the video frame 400 that correspond to replaceable objects (e.g., task 202), for example, by detecting or otherwise differentiating the boundaries of the corresponding regions of pixels from the underlying background content of the video frame 400 using machine learning, artificial intelligence, object recognition, or other pattern recognition or image analysis techniques. For each detected object region 402, 404, 406, the object recognition module 122 analyzes the respective set of pixels that comprise the respective region 402, 404, 406 to determine the type or other taxonomic classification of the respective object and discern additional physical and/or visual attributes of the respective object (e.g., task 204). For example, the object recognition module 122 may analyze the first region 402 to identify the detected object 402 as a large bowl, the object recognition module 122 may analyze the second region 404 to identify the second detected object 404 as a microwave having a particular make, model, manufacturer, and/or the like, and the object recognition module 122 may similarly analyze the third region 406 to identify the third detected object 406 as a refrigerator having a particular make, model, manufacturer, and/or the like. For each object 402, 404, 406, the content ingestion module 102 generates a unique identifier assigned to the respective object 402, 404, 406 to maintain an association between the respective object and the attribute metadata associated therewith in the detected object metadata table 142 in the data storage element 104, and then assigns the identifiers for the objects 402, 404, 406 to the portion of the media content 140 that includes the video frame 400 (e.g., task 206), for example, by tagging a file segment including the video frame 400 with object metadata fields that include the unique object identifiers along with indicia of their respective spatial locations within the frame 400.

Turning now to FIG. 5, with continued reference to FIGS. 1 and 3-4, during playback or presentation of the media content including the frame 400, the content distribution module 106 and/or content substitution process 300 detects or otherwise identifies the presence of replaceable objects 402, 404, 406 within the frame 400 based on the metadata associated with the media content stream (e.g., task 302). In response to identifying the associated metadata field values corresponding to replaceable objects, the content distribution module 106 retrieves or otherwise obtains the respective sets of metadata 142 characterizing the respective objects 402, 404, 406 from the data storage element 104.

For each object 402, 404, 406, the object substitution module 162 analyzes the respective attribute metadata associated therewith in relation to the potential substitute object metadata 118 and other selection or substitution criteria to identify a substitute object for the original object (e.g., task 304). For example, based on the first object 402 being classified as a bowl and the current time of day during which the media content is being presented or viewed being morning, the object substitution module 162 may identify a box of cereal as the substitute object that achieves the desired combination of similarity to the original object (e.g., a bowl) and temporal or contextual relevance to the current viewing context (e.g., morning). The object substitution module 162 retrieves or otherwise obtains stored cereal box imagery (e.g., substitute object content 116) from the data storage element 114 and then inserts the obtained cereal box imagery 502 at a spatial location within the augmented frame 500 that corresponds to the spatial location of the original bowl object 402 in the original frame 400 by overwriting any pixels of the bowl object 402 with new values or image data corresponding to the cereal box imagery 502 (e.g., task 306).

For the microwave object 404, the object substitution module 162 may identify a different microwave the substitute object that achieves the desired combination of similarity to the original object and temporal or contextual relevance to the current viewing context. For example, if the original microwave 404 is outdated, discontinued, unavailable in the geographic region where the client device 108 resides, etc., the object substitution module 162 may select or otherwise identify a substitute microwave that is not outdated, available at the geographic region where the client device 108 resides, etc. and is also similar in size and shape to the original microwave 404. The object substitution module 162 then retrieves or otherwise obtains stored microwave imagery for the substitute microwave from the data storage element 114 and then inserts the obtained microwave imagery 504 at the spatial location within the augmented frame 500 that corresponds to the spatial location of the original microwave object 404 in the original frame 400. Similarly, for the refrigerator object 406, the object substitution module 162 may identify a different refrigerator object that is more relevant to the current viewing context as the substitute object and insert the corresponding substitute refrigerator imagery 506 at the spatial location within the augmented frame 500 that corresponds to the spatial location of the original refrigerator object 406 in the original frame 400.

It should be noted there are numerous different potential manners or techniques for determining whether or what substitute object should be presented, and the subject matter is not intended to be limited to any particular implementation. For example, in practice, any number of different cost functions, optimizations, or other cost-benefit analyses could be employed based on various different parameters or variables. By way of example, different substitute objects may be provided or otherwise offered by different third-parties that contract with a provider of a distribution network to pay a particular rate or amount for substituted content, that may also take into account a variety of different factors, such as, for example, the number of viewers viewing the media content, the geographic locations of the respective viewers, the time of day and/or day of the week at the geographic locations of the respective viewers, whether media content is being live streamed or timeshifted, and/or the like. For example, for a live broadcast media program (e.g., a media program for which playback of the multimedia content is anchored to a particular point in time, such as a scheduled start time or air time for a prerecorded media program or the current time (or real-time) for a broadcast of a live event), a provider of a distribution network may receive different amounts of revenue from different third-parties for different potential substitute objects depending on the number of viewers viewing the media program and other contextual viewing information. In such embodiments, the object substitution module 162 may receive real-time metrics or statistics regarding the number of current viewers and analyze the current population of viewers when determining what substitute object should be inserted within the content of the live media program prior to downstream distribution. That said, other embodiments may perform substitution on a viewer-specific basis based on demographic information, user preferences, user behavior, and/or other characteristics of the viewer, which, in turn could similarly influence the potential revenue and corresponding cost and/or gain associated with the object substitution. The added costs of inserting objects into the media content and the subsequent post-processing and potential lag behind live for the live media program may also be accounted for when performing cost-based optimization of the object substitution.

After inserting substitute object content 502, 504, 506 in lieu of the original object content 402, 404, 406 to replace the original objects in the original video frame 400, the augmented video frame 500 may be further modified by the post-processing module 164 to resolve any discontinuities, visual artifacts, and/or the like (e.g., task 308). For example, where there is a size or shape mismatch between the original and substitute object content, the post-processing module 164 may scale the substitute object content to better match the size or dimensions of the original object content before filtering, smoothing, fusing, or otherwise blending the substitute object content with the surrounding original content in the augmented frame 500. The post-processed augmented frame 500 is then transmitted or otherwise provided to the media player 107 for presentation on the client device 108 in lieu of the original frame 400 at the timestamped or temporal location within the media content where the original frame 400 would otherwise normally occur. Thus, the media content is dynamically adapted to update the frame 400 and provide an improved viewing experience that contains substitute objects 502, 504, 506 that are more likely to be relevant or influential for the current viewer and/or the current viewing context.

As described above, various embodiments may employ self-learning or other artificial intelligence and machine learning techniques to continually increase the available library or database of reference object data for detection and/or substitution. Additionally, the concurrent analysis of the audio content corresponding to the analyzed video content may be utilized to improve the accuracy or reliability of the object detection and/or improve the relevance of the object substitution.

Figure 6:
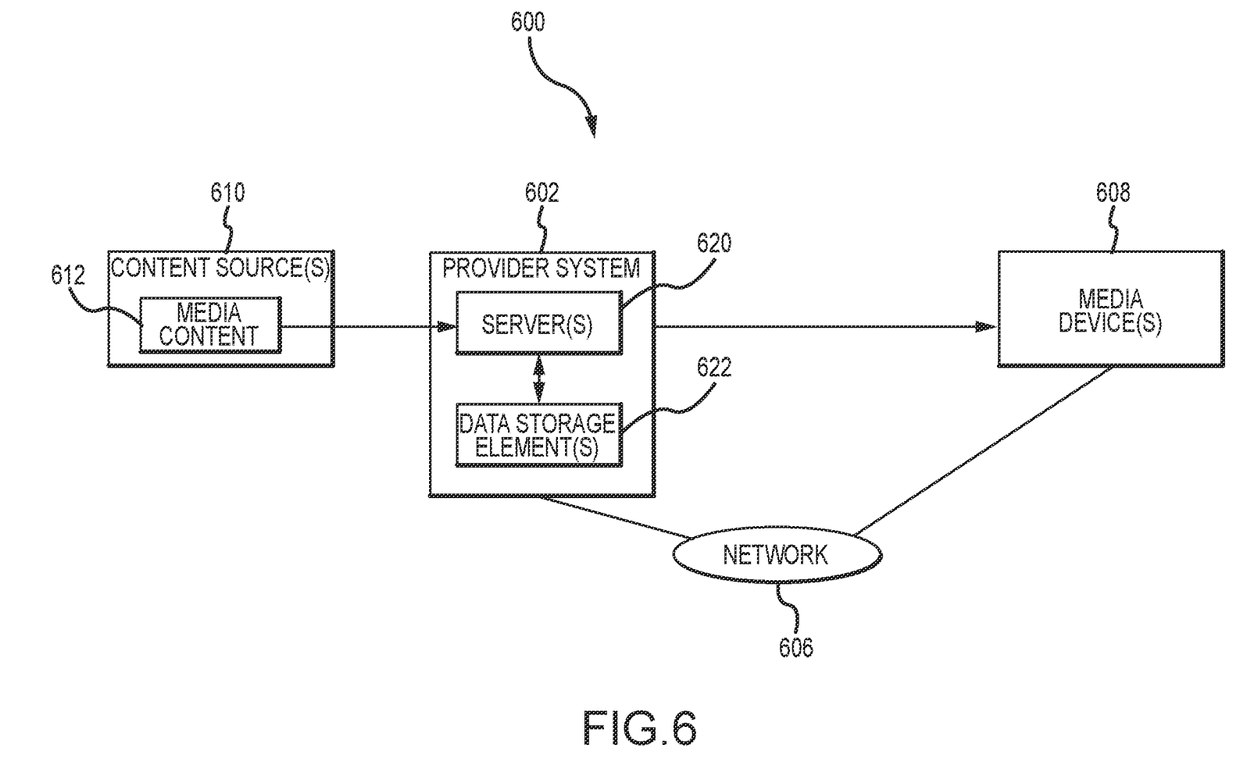
FIG. 6 depicts a block diagram of an exemplary embodiment of a media distribution system suitable for implementing the content ingestion process of FIG. 2 and/or the content substitution process of FIG. 3.

FIG. 6 depicts an exemplary embodiment of a media distribution system 600 suitable for implementing the subject matter described herein. The media distribution system 600 includes a provider system 602 that receives media content 612 (e.g., media content 112) from one or more content sources 610 (e.g., content source 110) and distributes the media content to one or more media devices 608 (e.g., client device 108) over a network 606, which, depending on the embodiment, could be realized as a satellite distribution network, a cable distribution network, a cellular communications network, an Internet communications network, or any other suitable distribution or communications network. It should be appreciated FIG. 6 is a simplified representation of a media distribution system 600 and is not intended to limit the subject matter described herein in any way.

The provider system 602 may be part of a provider headend, master control, or other similar system or facility associated with management or administration of one or more aspects of the multimedia distribution system 600. In the illustrated embodiment, the provider system 602 includes one or more server computing systems 620 and one or more data storage elements 622. The server computing systems 620 generally represent the server computer(s) or other computing device(s) coupled to the network 606 and capable of distributing media content 612 received from the content source(s) 610 to media device(s) 608 via the network 606. For example, the server computing system 620 may be configured as a host server or other web server implemented using a server computer system or data processing system that is based upon any processor, architecture and/or operating system, and will typically include at least a processing system and/or other hardware computing resources along with one or more data storage elements (or memory) capable of storing instructions, that, when read and executed by the processing system, cause the server 620 to support the content ingestion process 200 and/or the content substitution process 300 described herein. For example, the executable instructions may cause the server 620 to generate or otherwise support the content ingestion module 102 and/or the content distribution module 106. Various embodiments may be implemented using dedicated or shared hardware servers; other implementations may make use of virtual server features as part of a "cloud computing" service. Other embodiments may employ server clusters that support routing, load balancing, access and security mechanisms and/or any number of other features.

The data storage element(s) 622 generally represent the database(s) or other data storage elements (or combinations thereof) that are capable of storing one or more versions of the media content 612 provided by the content source 610 along with the metadata for replaceable objects detected within media content 612 (e.g., detected object metadata 142), metadata for potential substitute objects (e.g., substitute object metadata 118), and media content corresponding to potential substitute objects (e.g., substitute object content 116). For example, for a live broadcast media program provided by the content source 610, the provider server system 620 may encode the live broadcast media program content 612 into any number of different qualities and/or encode the live broadcast media program content 612 into one or more different formats (e.g., for distribution over the distribution network 606), while also tagging or otherwise encoding the media program content 612 to indicate or otherwise identify replaceable objects detected at different temporal and spatial locations within the live broadcast media program. The provider server system 620 may store encoded versions of the media content 612 in the provider data storage 622, and then live stream or otherwise distribute the encoded media content 612 to media devices 608 via the network 606, with portions of the distributed live broadcast media program including substitute objects at temporal and spatial locations within the live broadcast media program that correspond to the respective temporal and spatial locations where replaceable objects were detected, as described above in the context of FIGS. 1-5.

As noted, in alternative embodiments, the features and/or functionality of the provider server system 620 and/or the provider data storage 622 relating to one or more of the content ingestion process 200 and/or the content substitution process 300 could be implemented at one or more of the content source 610 and/or the end user media devices 608. For example, the content ingestion process 200 and/or the content substitution process 300 could be performed at the content source 610 prior to providing media content to the provider system 602. In this regard, in embodiments where the content substitution process 300 is implemented at the content source 610, the provider system 602 receives and distributes augmented media content that includes substitute objects in lieu of previously detected replaceable objects. In other embodiments, where the content substitution process 300 is performed at the media device 608, the media device 608 may utilize the tags or markups relating to replaceable objects that was provided by the content source 610 to identify substitute objects at the media device 608. In yet other embodiments, the content ingestion process 200 may be integrated with the content substation process 300 at the media device 608, such that the media device 608 (or the media player executing thereon) detects or otherwise identifies replaceable objects during playback of the media content and augments the media content with substitute objects on-the-fly in real-time before generating a graphical representation of the augmented media content at the media device 608.

It should be noted that the general systems, structures and techniques described above may be inter-combined, enhanced, modified and/or otherwise implemented to provide any number of different features. In particular, the term "exemplary" is used herein to represent one example, instance or illustration that may have any number of alternates. Any implementation described herein as "exemplary" should not necessarily be construed as preferred or advantageous over other implementations.

For the sake of brevity, conventional techniques related to broadcasting, streaming, networking, content distribution or delivery, communications standards or protocols, encoding/decoding standards or protocols, content formats, image and/or video processing, and other functional aspects of the systems (and the individual operating components of the systems) may not be described in detail herein. The subject matter may be described herein in terms of functional and/or logical block components, and with reference to symbolic representations of operations, processing tasks, and functions that may be performed by various computing components or devices. It should be appreciated that in alternative embodiments the various block components shown in the figures may be equivalently realized by any number of components configured to perform the specified functions. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus is not intended to be limiting. For example, terms such as "first," "second" and other such numerical terms referring to structures do not imply a sequence or order unless clearly indicated by the context.

While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents. Accordingly, details of the exemplary embodiments or other limitations described above should not be read into the claims absent a clear intention to the contrary.

What is claimed is:

1. An automated process comprising:
analyzing metadata associated with media content to identify a replaceable object within one or more frames of the media content, wherein the metadata includes a temporal location of the replaceable object within the frames of the media content and a pixel location indicating a spatial location of the replaceable object within one or more of the frames of the media content indicated by the temporal location;
identifying attributes associated with the replaceable object based on the metadata associated with the media content;
identifying a set of a plurality of potential substitute objects having respective attributes similar to the attributes associated with the replaceable object;
modifying the one or more frames of the media content indicated by the temporal location to include the substitute object at the pixel location within the one or more frames of the media content in lieu of the replaceable object, resulting in an augmented version of the media content that includes the substitute object instead of the replaceable object; and
providing the augmented media content that includes the substitute object instead of the replaceable object.

2. The automated process of claim 1 further comprising obtaining user profile information associated with a viewer of the media content.

3. The automated process of claim 2 further comprising identifying, from among the plurality of potential substitute objects, a smaller subset of potential substitute objects for the viewer using the user profile information.

4. The automated process of claim 3 further comprising identifying a current viewing context of the viewer.

5. The automated process of claim 4 further comprising identifying a substitute object temporally relevant to the current viewing context from among the smaller subset of potential substitute objects for the viewer.

6. The automated process of claim 5 wherein the smaller subset of potential objects for the viewer is based at least in part on at least one of a current time during which the media content is being presented.

7. The automated process of claim 5 wherein the smaller subset of potential objects for the viewer is based at least in part on at least one of a current date during which the media content is being presented.

8. The automated process of claim 1, wherein providing the augmented media content comprises a provider system transmitting the augmented media content to a client device over a network, wherein the media player at the client device presents the augmented media content to the viewer.

9. The automated process of claim 8, further comprising:
receiving, at the provider system, the media content from a content source; and
storing, by the provider system, the metadata indicating the replaceable object at the spatial location within the media content and the attributes of the replaceable object in association with the media content.

10. A non-transitory computer-readable medium having computer-executable instructions stored thereon that, when executed by a processing system, cause the processing system to perform the automated process of claim 1.

11. A data processing system comprising a processor, non-transitory storage and an interface to a network, wherein the non-transitory storage comprises computer-executable instructions that, when executed by the processor, perform an automated process that comprises:
analyzing metadata associated with media content to identify a replaceable object within one or more frames of the media content, wherein the metadata includes a temporal location of the replaceable object within the frames of the media content and a pixel location indicating a spatial location of the replaceable object within one or more of the frames of the media content indicated by the temporal location;
identifying attributes associated with the replaceable object based on the metadata associated with the media content;
identifying a set of a plurality of potential substitute objects having respective attributes similar to the attributes associated with the replaceable object;
modifying the one or more frames of the media content indicated by the temporal location to include the substitute object at the pixel location within the one or more frames of the media content in lieu of the replaceable object, resulting in an augmented version of the media content that includes the substitute object instead of the replaceable object; and
providing the augmented media content that includes the substitute object instead of the replaceable object.

12. The system of claim 11 wherein the automated process further comprises obtaining user profile information associated with a viewer of the media content.

13. The system of claim 12 wherein the automated process further comprises identifying, from among the plurality of potential substitute objects, a smaller subset of potential substitute objects for the viewer using the user profile information.

14. The system of claim 13 wherein the automated process further comprises identifying a current viewing context of the viewer.

15. The system of claim 14 wherein the automated process further comprises identifying a substitute object temporally relevant to the current viewing context from among the smaller subset of potential substitute objects for the viewer.

16. The system of claim 15 wherein the smaller subset of potential objects for the viewer is based at least in part on at least one of a current time during which the media content is being presented.

17. The system of claim 15 wherein the smaller subset of potential objects for the viewer is based at least in part on at least one of a current date during which the media content is being presented.

* * * * *